United States Patent [19]

Jones

[11] 4,187,556
[45] Feb. 5, 1980

[54] ELECTRO-ACOUSTIC TRANSDUCER WITH LINE FOCUS

[75] Inventor: Charles H. Jones, Murrysville, Pa.

[73] Assignee: The United States of America as represented by the Secretary of the Navy, Washington, D.C.

[21] Appl. No.: 20,230

[22] Filed: Apr. 5, 1960

[51] Int. Cl.² ........................................... H04B 11/00
[52] U.S. Cl. ..................................... 367/155; 310/334; 367/159
[58] Field of Search .................... 340/9, 10; 310/9.6, 310/334

[56] References Cited

U.S. PATENT DOCUMENTS

| | | | |
|---|---|---|---|
| 2,405,226 | 8/1946 | Mason | 310/334 |
| 2,640,165 | 5/1953 | Howatt | 310/334 |
| 2,829,361 | 4/1958 | Crandell et al. | 340/10 |
| 2,837,728 | 6/1958 | Shuch | 340/9 |

*Primary Examiner*—Nelson Moskowitz
*Attorney, Agent, or Firm*—Louis A. Miller; Rolla N. Carter

EXEMPLARY CLAIM

1. A transducer for translating compressional waves in a liquid medium into electrical waves in an electric circuit and vice versa comprising an elongated transducer element having a spherically concave active face disposed with its smaller dimension between two circles of latitude spaced apart in a hemisphere a distance substantially equal to the wavelength in the liquid medium of a predetermined operating frequency.

1 Claim, 5 Drawing Figures

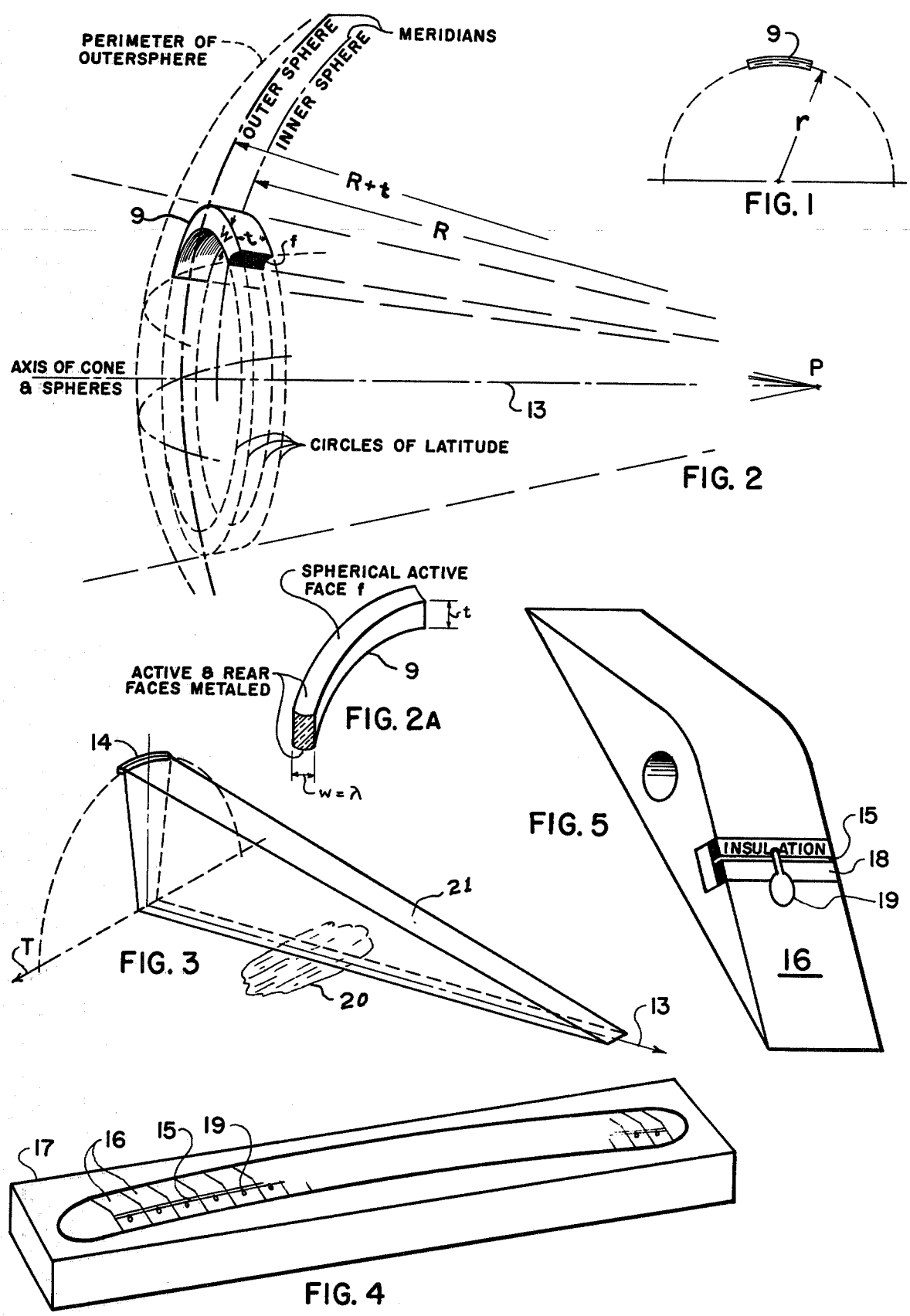

ELECTRO-ACOUSTIC TRANSDUCER WITH LINE FOCUS

The present invention relates to underwater acoustic systems and more particularly to transducers for the projection or reception of acoustic energy focused along a straight narrow band and which with known circuitry has a highly directive beam for transmission or reception. The specific embodiment to be described in detail was designed for utilization in an acoustical system for making facsimile recordings of the sonic echo values of a water submerged surface.

One such system included an electro-acoustic transmitting and receiving transducer system adapted to scan in range with a narrow vertically oriented fan shaped beam and in succession adjacent narrow strips of a submerged surface, the received sonic reflections being employed to synthesize a two dimensional visible record containing information concerning the size, shape and position of objects on or near such submerged surface.

A patent to Twyman, U.S. Pat. No. 1,287,595, shows that is has long been known that sound emitted in phase by a straight line row of sound emitting elements will, for a considerable distance, be restricted very closely to the neighborhood of a plane perpendicular to the row, the degree of localization depending upon the ratio of the length of the row to the wavelength of the sound waves emitted. However, for high resolution over an extended range as here contemplated, excessively high frequencies are involved, because the resolution achieved with that method is never better than the length of the array.

Several techniques are known for focusing sound in a liquid medium including direct focusing action from a curved transducer. Spherical or cylindrical shapes can be constructed from a multiplicity of transducer elements or from a single block of piezoelectric material ground to the desired curvature. Because barium titanate ceramic does not have fixed piezoelectric axes, almost any desired shape can be obtained by casting or molding and subsequent firing, grinding, and polarizing. See, for example, "Sonics", by Hueter and Bolt (John Wiley & Sons, 1955), page 266. Hueter and Bolt also point out, page 135, that a common method of assembling piezoelectric stack mosaics is to cement the back faces of half wave-length stacks on a pressure release material such as Corprene or foam rubber and immerse them in an oil-filled container having a rubber sound window.

In accordance with the present invention, a transducer is so shaped that maximum radiation is directed toward maximum range and the radiation is focused along a line over the entire gamut of ranges. This is accomplished, ideally, by making the transducer out of a single rod of piezoelectric material, such as barium titanate, with the front face machined so that all elements lie on the surface of a sphere and its longitudinal center line lies on a circumference of a right circular cone having its vertex at the center of the sphere. Since all points on the circumference of the base of a right circular cone are equidistant to any particular point on the axis of the cone, all energy radiated in phase on the circumference will arrive in phase at each point on the axis and thus the radiator is focused all along the axis.

The primary object of the invention, therefore, is to provide an improved transducer having a directional characteristic which is fan shaped and is focused along an axis defined by the transducer.

Other objects and the attendant advantages of the invention will become apparent from the following description when read in connection with the accompanying drawing in which:

FIGS. 1, 2 and 2A are diagrams illustrating the derivation of a transducer shape according to the invention;

FIG. 3 is an isometric view showing a transducer and the manner in which a line focus is obtained;

FIG. 4 is a view in perspective of a transducer constructed in accordance with the preferred embodiment of the invention;

FIG. 5 is a view in perspective of an individual transducer element holder utilized in assembling the transducer of FIG. 4.

The ideal shape of the transducer is a segment 9 of the ring formed by the intersection of a conical shell and a spherical shell as illustrated in FIGS. 1, 2 and 2A. The spherical shell has an inside radius R and a thickness t and the cone has a base radius r, a slant height R and a thickness w. The apex of the cone is at the center of the sphere, point P. The active face or surface f of the transducer is the side toward the point P. This active face f has a width w which is generally substantially equal one wave length in water. The transducer has a thickness t which is one half wave length in the piezoelectric material (or an odd multiple of one half wave length) so that it is resonant in the thickness mode at the frequency employed. The crystal is mounted in a support structure in such a way that the face f is coupled to the water through a rubber diaphragm. The other three surfaces are isolated from the water by the rigid water-tight support structure as is well known.

The desirability of utilizing longitudinal vibration along the thickness dimension for frequencies above 500 kilocycles is well known in the art and is explained, for example, in "Electromechanical Transducers and Wave Filters", by W. P. Mason (Van Nostrand, 1942), at page 197.

It will be apparent from the foregoing that the active face f of the segment 9 is spherically concave and disposed with its smaller dimension w between two circles of latitude of a sphere with radius R i.e., said two circles are latitudinally spaced by the dimension w. The active face f thus defines an axis 13 coinciding with a diameter of the sphere centered at P.

Referring now to FIG. 3, there is shown an elongated transducer 14 having its longitudinal center line coinciding with a circle of latitude and having its active face spherically concave the same as the segment 9 of FIGS. 1, 2 and 2A. With this arrangement, the transducer 14 when energized will transmit the majority of its energy within the confines of a volume 21 the shape of a truncated tetrahedron if it is considered that the transmitted sound is intercepted by a horizontal plane such as the ocean floor 20 through the axis 13 defined by the transducer 14. For the reasons pointed out above, all points on the longitudinal center line of the transducer 14 are equidistant from any point on the axis 13 and thus, if all points on the transducer 14 are energized in phase, the transmitted beam is in focus at all points along the axis 13. To obtain the desired fan shape directivity pattern, the width w of the transducer 14 is chosen to be substantially equal to the wavelength of the operating frequency and is given a length which is a compromise resulting from desired resolution and desired depth of focus, i.e., to obtain higher resolution the length of the transducer is increased but to obtain greater depth of focus the length of the transducer must be decreased. In one system for practicing the invention, the transducer 14 was towed in the direction T at a heighth of 15 feet above the bottom and hence r was 15 feet, the operating frequency was 1.5 megacycles, and the width w of the transducer 14 was equal to 0.040 inches, i.e., the wavelength at this operating frequency, and the declivity chosen was 20° so that the radius R was approximately 44 feet. This arrangement produced a directivity pattern in the vertical plane of 44.8° at the 3 db points with practically no side lobes at 30 db down. With a transducer 14 being a 23 inch segment of a circle of latitude with a 15 foot radius and towed at a heighth above the bottom equal to its radius, i.e., 15 feet, the resolution in azimuth at 75 feet in range was approximately 3 inches, being somewhat less at zero range, i.e., directly beneath the transducer 14.

Although ideally and with other parameters the transducer 14 could be a single piezoelectric element longitudinally bent about one radius and having its active face spherically concave about a larger radius, as a practical matter when these radii are 15 and 44 feet, respectively, a plurality of planar transducer elements can be arranged in a plane inclined to the vertical and having their longitudinal center lines tangent to the circle of latitude having a radius r. Such a practical embodiment is shown in FIG. 4 as comprising a plurality of crystal elements 15 individually supported in holders 16 as shown in FIG. 5 and mounted in end-to-end relationship on a rigid bar 17 with their centers lying on a 15 foot radius. The crystal elements 15 are suitably mounted in electric and acoustic insulating material 18 such as Corprene or foam rubber and provided with an electrode lead 19 as is well known. In accordance with known principles of construction and operation, each of the crystal elements 15 is provided on its front and rear faces with a conducting plate or film which serves as an electrode. The holder 16 for the transducer elements 15 is beveled so that the faces of the elements 15 are directed downwardly the desired angle from the horizontal to provide the chosen declivity for the axis of its directivity pattern. After assembly on the bar 17 as shown in FIG. 4, a rubber diaphragm may be fitted thereover and either evacuated or filled with oil to insure good contact between the crystal driving faces and the diaphragm as is well known, the oil and rubber furnishing the desired acoustic coupling and an impedance match between the water and the crystals. For simplicity, such structural details have been omitted in the drawing since they are well known and form no part of the present invention per se.

While for the purpose of disclosing the invention only the preferred embodiment thereof and exemplary parameters therefor have been described in detail, it will be evident to those skilled in the art that many modifications may be made without departing from the scope of the invention defined by the appended claims.

What is claimed is:

1. A transducer for translating compressional waves in a liquid medium into electrical waves in an electric circuit and vice versa comprising an elongated transducer element having a spherically concave active face disposed with its smaller dimension between two circles of latitude spaced apart in a hemisphere a distance substantially equal to the wavelength in the liquid medium of a predetermined operating frequency.

2. An electro-acoustic transducer comprising a plurality of transducer elements having elongated active faces tangent to and whose longitudinal center lines lie substantially in a circle of latitude of a sphere.

3. An electro-acoustic transducer comprising a plurality of transducer elements having elongated active faces in end-to-end relation along a center line lying on the surface of a sphere and on the perimeter of the base of a right circular cone having its vertex coincident with the center of said sphere, said transducer elements upon being energized in phase will transmit acoustic energy focused along a line coincident with the axis of said cone.

4. An electro-acoustic transducer array capable of focusing compressional wave energy along a longitudinal axis in a liquid medium when energized with electrical energy at a predetermined operating frequency comprising a plurality of elongated transducer elements arranged in end-to-end relation along and tangent to a circle of latitude of a sphere, the width of said elements being disposed between two circles of latitude spaced a latitude dimension substantially equal to the wavelength in the liquid medium of said operating frequency.

* * * * *